(12) United States Patent
Inagaki et al.

(10) Patent No.: US 8,227,100 B2
(45) Date of Patent: Jul. 24, 2012

(54) NEGATIVE ACTIVE MATERIAL FOR LITHIUM ION BATTERY AND LITHIUM ION BATTERY INCLUDING THE SAME

(75) Inventors: Toru Inagaki, Minoh (JP); Akira Takamuku, Minoh (JP); Geun-Bao Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 822 days.

(21) Appl. No.: 12/314,438

(22) Filed: Dec. 10, 2008

(65) Prior Publication Data

US 2009/0148774 A1    Jun. 11, 2009

(30) Foreign Application Priority Data

Dec. 11, 2007   (JP) ................................. 2007-320009

(51) Int. Cl.
*H01M 4/131*   (2010.01)
*H01M 4/485*   (2010.01)
*C01G 31/02*   (2006.01)

(52) U.S. Cl. ... 429/5; 429/231.2; 429/231.5; 429/231.6; 423/594.16; 423/594.8

(58) Field of Classification Search ........... 429/5, 231.2, 429/231.5, 231.6; 423/594.16, 594.8
See application file for complete search history.

(56) References Cited

U.S. PATENT DOCUMENTS

| | | | |
|---|---|---|---|
| 7,682,746 B2 * | 3/2010 | Koshina | 429/231.5 X |
| 2001/0036578 A1 * | 11/2001 | Nishida et al. | 429/231.3 |
| 2005/0069774 A1 * | 3/2005 | Miyazaki et al. | 429/231.3 |

* cited by examiner

*Primary Examiner* — Stephen J. Kalafut
(74) *Attorney, Agent, or Firm* — Robert E. Bushnell, Esq.

(57) ABSTRACT

The present invention relates to a negative active material for a lithium ion battery and a lithium ion battery including the negative active material. The negative active material for a lithium ion battery includes a hexagonal lithium vanadium composite oxide including lithium, vanadium, and magnesium. The lithium and the vanadium are included in a mole ratio within a range of $1.15 \leqq Li/V \leqq 1.35$, and the magnesium and the vanadium are included in a mole ratio within a range of $0.01 \leqq Mg/V \leqq 0.06$. The present invention provides a negative active material for a lithium ion battery having a stable crystal structure, excellent high rate of charge and discharge, and good charge and discharge cycle characteristics.

18 Claims, 2 Drawing Sheets

NEGATIVE ACTIVE MATERIAL FOR LITHIUM ION BATTERY AND LITHIUM ION BATTERY INCLUDING THE SAME

CLAIM OF PRIORITY

This application makes reference to, incorporates the same herein, and claims all benefits accruing under 35 U.S.C. §119 from an application earlier filed in the Japanese Patent Office on 11 Dec. 2007 and there duly assigned Serial No. 2007-320009.

BACKGROUND OF THE INVENTION

1. Field of the Invention

The present invention relates to a negative active material used in a manufacture of a lithium ion battery and a lithium ion battery including the negative active material, and more particularly, to a negative active material having high crystallinity and excellent high rate charge and discharge and good cycle characteristics during cyclic charge and discharge, and a lithium ion battery having the negative active material.

2. Description of the Related Art

A lithium ion battery generally includes a negative electrode and a positive electrode, and a separator disposed between the negative electrode and the positive electrode. The negative electrode provides electrons during a battery discharge, a positive electrode gains electrons provided by the negative electrode during the battery discharge, the separator sandwiched between said positive electrode electrically insulates the negative electrode and the positive electrode. A contemporary negative active material of the negative electrode used in the manufacture of a lithium ion battery includes various carbon materials, such as artificial graphite, natural graphite, hard carbon, and the like, and these carbon materials may intercalate and deintercalate lithium. In order to improve the performance of the lithium ion battery, many researches have been done on these carbon materials to obtain the improved utilization rate and charge density of electrode volume. The carbon materials have an actual charge capacity very close to the theoretical charge capacity (372 mAh/g) of graphite and thus have a disadvantageous limit in improving the charge density, therefore, the carbon materials are problematic in achieving high-capacity of a battery. The charge capacity here is a measurement for the charge capacity of the carbon materials per unit weight. Unit "mAh" refers to "amperes (mili amperes)×time (hours)". Unit "g" refers to gram.

Accordingly, a metal lithium and a silicon alloy material have been researched as a negative active material, however, they have not been extensively used because of the stress accompanied by the expansion and the contraction of an electrode of the battery.

Additionally, a lithium vanadium oxide may be used as a negative active material with a higher capacity and a less stress induced by the expansion and the contraction of the electrode. Japanese Patent Laid-Open Publications No. 2002-216753, No. 2003-68305, and No. 2005-072008 disclose a lithium vanadium oxide.

Because the compound disclosed in Japanese Patent Laid-Open Publication No. 2002-216753 has no hexagonal crystal and has an equilibrium potential around 0.7V, such compound may not be appropriately used as a negative active material. In addition, the compounds disclosed in Japanese Patent Laid-Open Publication No. 2003-68305 and No. 2005-072008 not only have a disadvantageous significant change in the crystal structure accompanying intercalation and deintercalation of lithium ions during the charge and discharge of the battery, but also have problems during a procedure of the cyclic charge and discharge.

SUMMARY OF THE INVENTION

It is therefore one object of the present invention to provide an improved negative active material for manufacturing a lithium ion battery in order to overcome the disadvantageous change in the crystal structure accompanying intercalation and deintercalation of lithium ions during the charge and discharge of the battery, and to improve the weak discharge cycle characteristics in the contemporary negative active materials.

It is another object of the present invention to provide a negative active material for a lithium ion battery having a stable crystal structure and an excellent high rate charge and a good discharge cycle characteristics during the cyclic charge and discharge.

It is still another object of the present invention to provide a negative electrode including the negative active material for a lithium ion battery.

It is yet another object of the present invention to provide a lithium ion battery including the negative active material for a lithium ion battery.

The embodiments of the present invention are not limited to the above technical purposes, and a person of ordinary skill in the art can understand other technical purposes.

In accordance with an embodiment of the present invention, a negative active material used to form a lithium ion battery includes a hexagonal lithium vanadium composite oxide including lithium, vanadium, and magnesium. The lithium (Li) and the vanadium (V) have a mole ratio within a range of $1.15 \leq Li/V \leq 1.35$. The magnesium (Mg) and the vanadium (V) have a mole ratio within a range of $0.01 \leq Mg/V \leq 0.06$. In accordance with another embodiment of the present invention, a negative electrode includes the negative active material for a lithium ion battery.

In accordance with still another embodiment of the present invention, a lithium secondary battery includes a positive electrode including a positive active material intercalating and deintercalating lithium ions, a negative electrode including the negative active material, and an electrolyte.

Further embodiments of the present invention will also be described in detail.

When a lithium vanadium composite oxide constructed as the present invention is used as a negative active material, the lithium vanadium composite oxide may improve the capacity of charge and discharge and the characteristics of cyclic charge and discharge of a lithium ion battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

According to the exemplary embodiments of the present invention, a lithium ion battery may have a shape such as a coin, a button, a sheet, a cylinder, a plate, a prism, and the like. These lithium ion batteries include a negative electrode, a positive electrode, an electrolyte, a separator, and the like.

Figure 1:
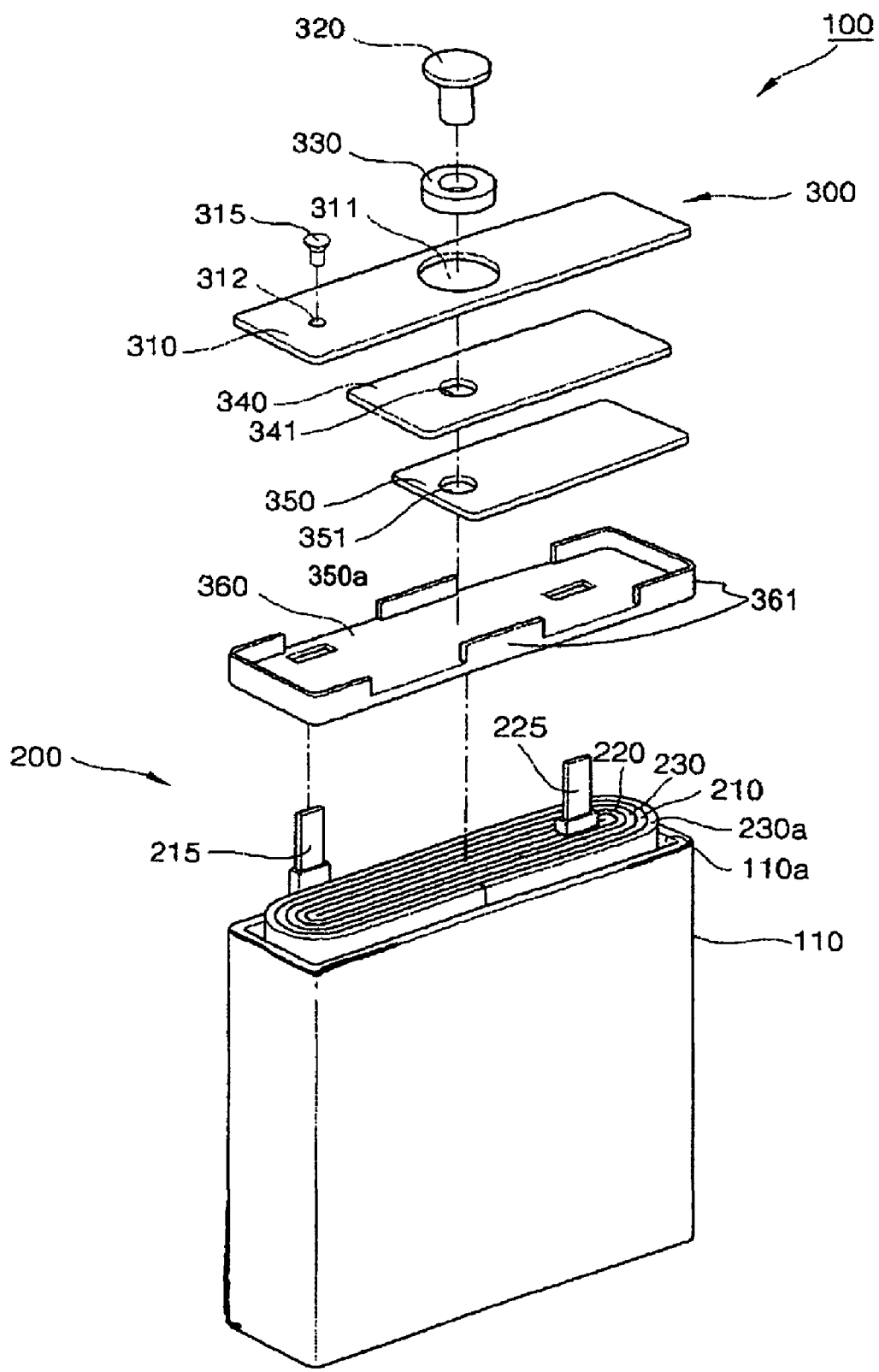
FIG. 1 is an exploded perspective view of an exemplary lithium ion battery having a prism shape.

FIG. 1 is an exploded perspective view of an exemplary lithium ion battery having a prism shape. As shown in FIG. 1, lithium ion battery 100 is composed of can 110 of a rechargeable battery, electrode assembly 200 which is provided in can 110, and cap assembly 300 which is connected to the upper part of can 110. It should be understood that the principle of the invention disclosed and claimed herein are not confined to the particular implementation of those principles represented by FIG. 1. Can 110 is made of a metallic material having cylindrical or rectangular shape, with one side open having open end 110a, and can 110 may serve as a terminal.

Electrode assembly 200 is composed of positive electrode 210 to which positive electrode tap 215 is attached, negative electrode 220 to which negative electrode tap 225 is attached, and separator 230 provided between positive electrode 210 and negative electrode 220 in the rolled shape. Further, electrode assembly 200 includes an insulating tape 230a that covers the outer surface of electrode assembly 200.

Insulating case 360 having rims 361 is arranged on electrode assembly 200 inserted into can 110, and thus prevents short-circuit between electrode assembly 200 and cap plate 310. Cap plate 310 seals open end 110a, and is electrically connected to positive electrode tap 215. Negative electrode tap 225 is welded to the lower surface 350a of terminal plate 350 which is electrically connected to electrode terminal 320 installed through electrode through-hole 311 of cap plate 310. In order to insulate electrode terminal 320 and cap plate 310, electrode terminal 320 is installed in electrode through-hole 311 via a gasket 330, in order to insulate cap plate 310 and terminal plate 350, an insulating plate 340 is installed between terminal plate 350 and cap plate 310. Through-holes 341, 351 are formed in insulating plate 340 and a terminal plate 350 respectively, electrode terminal 320 to terminal plate 350 are electrically connected.

After cap plate 310 is welded to can 110 and finished, an electrolyte (not shown in figures) is supplied to the electrode assembly through an injection port 312 and injection port 312 is sealed by plug 315.

Negative electrode 220 may include a hexagonal lithium vanadium composite oxide including lithium, vanadium, and magnesium as main components. The lithium (Li) and the vanadium (V) are included in a mole ratio within a range of $1.15 \leq Li/V \leq 1.35$. The magnesium (Mg) and the vanadium (V) are included in a mole ratio within a range of $0.01 \leq Mg/V \leq 0.06$.

When the lithium (Li) and the vanadium (V) are included in a mole ratio within a range of $1.15 \leq Li/V \leq 1.35$, the lithium vanadium composite oxide may have smooth intercalation and deintercalation of lithium ions and a stable crystal structure.

In addition, when the magnesium (Mg) and the vanadium (V) are included in a mole ratio within a range of $0.01 \leq Mg/V \leq 0.06$, the lithium vanadium oxide may have a stable crystal structure.

The lithium vanadium composite oxide may further include at least one element (Me) selected from IIA to IVB groups in the periodic table. IIA to IVB groups include Beryllium, Magnesium, Calcium, Strontium, Barium, Radium, Scandium, Yttrium, lanthanoid, actinoid, Titanium, Zirconium, Hafnium and Rutherfordium.

The element (Me) may include Ti, Zr, Mo, Al, and the like. These elements (Me) may be used as singularly or in combination of two or more.

Since the lithium vanadium composite oxide includes the element (Me), it may suppress the deterioration of capacity during charge and discharge cycles and thereby improve the cycle characteristic.

The element (Me) and vanadium (V) are included in a mole ratio within a range of $Me/V \leq 0.04$. When the element (Me) and vanadium (V) have a mole ratio of $Me/V \leq 0.04$, the resulting composite may have a stable crystal structure and the improved cycle characteristic.

Lattice constant refers to the constant distance between unit cells in a crystal lattice. Lattices in three dimensions generally have three lattice constants, referred to as a, b, and c. The lithium vanadium composite oxide may appropriately have a ratio of lattice constants a and c within a range of $5.10 \leq c/a \leq 5.15$. In another embodiment, the lithium vanadium composite oxide may appropriately have a ratio of lattice constants a and c within a range of $5.12 \leq c/a \leq 5.13$.

When the ratio of lattice constants a and c is within a range of $5.10 \leq c/a \leq 5.15$, the lithium vanadium composite oxide may have a stable crystal structure so that lithium ions may be easily intercalated and deintercalated, thus improving capacity cycle-life, when a battery is repeatedly charged and discharged.

In addition, a desirable lithium vanadium composite oxide may have a single exothermic peak at a temperature ranging from 90° C. to 130° C. regarding differential scanning calorimetry (DSC). Differential scanning calorimetry (DSC) is a thermo-analytical technique where the difference in the amount of heat required to increase the temperature of a sample and of a reference are measured as a function of temperature. Both of the sample and reference are maintained at approximately same temperature throughout the experiment. In another embodiment, it may have a single exothermic peak at a temperature ranging from 105° C. to 120° C.

When it has a single exothermic peak at a temperature ranging from 90° C. to 130° C., it has a stable crystal structure, improving the cycle-life of the capacity of the battery when a battery is repeatedly charged and discharged.

The lithium vanadium composite oxide is prepared by firstly adding a small amount of other additives to a vanadium oxide such as $V_2O_3$, $V_2O_5$, $V_2O_4$, $V_3O_4$, and the like and a magnesium compound such as $Li_2CO_3$, MgO, $MgCO_3$, and the like, secondly mixing them together, and thirdly firing the mixture at a temperature ranging from 1100° C. to 1300° C. for a few hours under a nitrogen atmosphere in a pot. Herein, when an element (Me) is added as the additive to the lithium vanadium composite oxide, an oxide or a carbonate of the element (Me) should be added.

The positive electrode may include a composite oxide or a composite sulfide of a transition element such as Ti, Mo, W, Nb, V, Mn, Fe, Cr, Ni, Co, and the like, which includes Li, a vanadium oxide, an organic conductive material such as a conjugated polymer and the like, a Chevrel-phased compound, and the like as an active material.

The positive and negative electrodes may be prepared by appropriately adding an additive among a conductive agent, a binder, a filler, a dispersing agent, an ion conductive agent, and the like to the active material powder.

The conductive agent may include graphite, carbon black, acetylene black, ketjen black, carbon fiber, metal powder, and the like. The binder may include polytetrafluoro ethylene, polyfluoro vinylidene, polyethylene, and the like.

The positive or negative electrode is prepared by preparing a slurry or paste by adding a mixture of the active material and each additive to a solvent such as water, an organic solvent, or the like, coating the slurry or paste, drying the slurry or paste, and compressing the slurry or paste with a pressing roll or the like.

The electrode-supporting substrate may include a film, a sheet, or a net made of copper, nickel, stainless steel, aluminum, and the like, a sheet or a net made of carbon fiber, and the like. On the other hand, the positive or negative electrode can be fabricated into a pellet form just through compression without an electrode-supporting substrate.

The electrolyte may include a non-aqueous electrolyte prepared by dissolving a lithium salt in an organic solvent, a polymer electrolyte, an inorganic solid electrolyte, a polymer electrolyte, a composite material with an inorganic solid electrolyte, and the like.

The solvent of the non-aqueous electrolyte may include cyclic ester series such as ethylene carbonate, propylene carbonate, and the like; linear ester series such as dimethyl carbonate, diethylcarbonate, methylethylcarbonate, and the like; γ-lactone series such as γ-butyl lactone and the like; linear ether series such as 1,2-dimethoxy ethane, 1,2-diethoxy ethane, ethoxymethoxyethane, and the like; cyclic ether series such as tetrahydrofuran and the like; nitrile series such as acetonitrile and the like; and the like.

A lithium salt as the solute of the non-aqueous electrolyte may be selected from the group consisting of $LiAsF_6$, $LiBF_4$, $LiPF_6$, $LiAlC_{14}$, $LiClO_4$, $LiCF3SO_3$, $LiSbF_6$, $LiSCN$, $LiCl$, $LiC_6H_5SO_3$, $LiN(CF_3SO_2)_2$, $LiC(CF_3SO_2)_3$, and $LiC_4P_9SO_3$.

The separator may include a multi-porous film made of a polyolefin such as polypropylene, polyethylene, or the like, or a porous material such as a glass filter, a non-woven fabric, and the like.

Furthermore, the present invention may be prepared by combining a part or all of preparation examples or modified preparation examples herein, and they may be modified as long as they fulfill the purpose of the present invention.

Hereinafter, the present invention is illustrated in more detail through the following examples, but it is not limited thereto.

EXAMPLES

Preparation of a Lithium Vanadium Composite Oxide

Examples 1 to 6

$V_2O_4$, $Li_2CO_3$, and MgO were mixed for one hour in an automatic mortar according to a ratio of Examples 1 to 6 in Table 1 and then fired at 1200° C. under a nitrogen flow in a graphite pot for 3 hours, preparing a lithium vanadium composite oxide of Examples 1 to 6.

Examples 7 to 10

Lithium vanadium composite oxides respectively including Al, Ti, Zr, and Mo as an additive element were prepared by mixing $V_2O_4$, $Li_2CO_3$, and MgO, and $Al_2O_3$, $TiO_2$, $ZrO_2$, or $MoO_2$ according to a ratio of Examples 7 to 10 in the following Table 1 according to the same method as aforementioned.

Comparative Examples 1 to 4

$V_2O_4$, $Li_2CO_3$, and MgO were mixed according to the same method as Examples 1 to 6, preparing lithium vanadium composite oxides of Comparative Examples 1 to 4.

As shown in Table 1, a lithium vanadium composite oxide of Comparative Example 1 did not include Mg. That of Comparative Example 2 excessively included Mg, that of Comparative Example 3 included little Li, and that of Comparative Example 4 excessively included Li.

Evaluation of Lithium Vanadium Composite Oxides

The lithium vanadium composite oxides of Examples 1 to 10 and Comparative Examples 1 to 4 were evaluated regarding thermal characteristics by using differential scanning calorimetry (DSC). The evaluation was performed under an Ar flow while heating by 10° C./min in a range of room temperature to 300° C.

In addition, the lithium vanadium composite oxides of Examples 1 to 10 and Comparative Examples 1 to 4 were also evaluated regarding crystal structure by using a high powered X-ray diffraction device under conditions of a voltage of 50 kV, a current of 300 mA, a step width of 0.02°, and a scanning speed of 1°/min. The results were calculated into a lattice constant.

The experimental results are provided in Table 1.

TABLE 1

|  |  | Li/V mole ratio | Mg/V mole ratio | Additive element beside Mg/V mole ratio | DSC exothermic peak (° C.) | Lattice constant | | |
|---|---|---|---|---|---|---|---|---|
|  |  |  |  |  |  | a (Å) | c (Å) | c/a |
| Example | 1 | 1.25 | 0.01 | — | 127 | 2.86 | 14.701 | 5.14 |
|  | 2 | 1.25 | 0.02 | — | 119 | 2.863 | 14.696 | 5.133 |
|  | 3 | 1.25 | 0.04 | — | 110 | 2.865 | 14.667 | 5.12 |
|  | 4 | 1.25 | 0.06 | — | 95 | 2.868 | 14.634 | 5.103 |
|  | 5 | 1.15 | 0.04 | — | 120 | 2.856 | 14.674 | 5.138 |
|  | 6 | 1.35 | 0.04 | — | 106 | 2.867 | 14.673 | 5.118 |
|  | 7 | 1.25 | 0.02 | Al/V = 0.02 | 112 | 2.864 | 14.675 | 5.124 |
|  | 8 | 1.25 | 0.02 | Ti/V = 0.02 | 109 | 2.862 | 14.659 | 5.122 |
|  | 9 | 1.25 | 0.02 | Zr/V = 0.02 | 115 | 2.864 | 14.664 | 5.121 |
|  | 10 | 1.3 | 0.02 | Mo/V = 0.02 | 119 | 2.866 | 14.7 | 5.128 |
| Comparative Example | 1 | 1.25 | 0 | — | 140 | 2.857 | 14.739 | 5.159 |
|  | 2 | 1.25 | 0.08 | — | 86 | 2.87 | 14.626 | 5.093 |
|  | 3 | 1.1 | 0.04 | — | 160 | 2.853 | 14.71 | 5.156 |
|  | 4 | 1.4 | 0.04 | — | 89 | 2.87 | 14.63 | 5.097 |

As shown in Table 1, the lithium vanadium composite oxides of Examples 1 to 10 having a lithium/vanadium mole ratio in a range of $1.15 \leq Li/V \leq 1.35$ and a magnesium/vanadium mole ratio in a range of $0.01 \leq Mg/V \leq 0.06$ had a lattice constant a/c ratio in a range of $5.10 \leq c/a \leq 5.15$.

On the other hand, the lithium vanadium composite oxides of Comparative Examples 2 and 4 respectively including Mg and Li in an excessive amount (relatively including less V) had a lattice constant a/c ratio of c/a<5.10. The lithium vanadium composite oxides of Comparative Example 3 (i.e., relatively including more V) had a lattice constant a/c ratio of c/a>5.10.

In addition, the lithium vanadium composite oxides of Examples 1 to 10 had a DSC exothermic peak ranging from 90° C. to 130° C. The lithium vanadium composite oxides of Comparative Examples 1 and 3 respectively including no Mg and less Li (i.e., relatively including more V) had a DSC exothermic peak of 130° C. or higher. The lithium vanadium composite oxides of Comparative Examples 2 and 4 had a DSC exothermic peak of 90° C. or lower.

Subsequently, the lithium vanadium composite oxides of Examples 1 to 10 and Comparative Examples 1 to 4 were evaluated regarding negative active material characteristics as follows.

Figure 2:
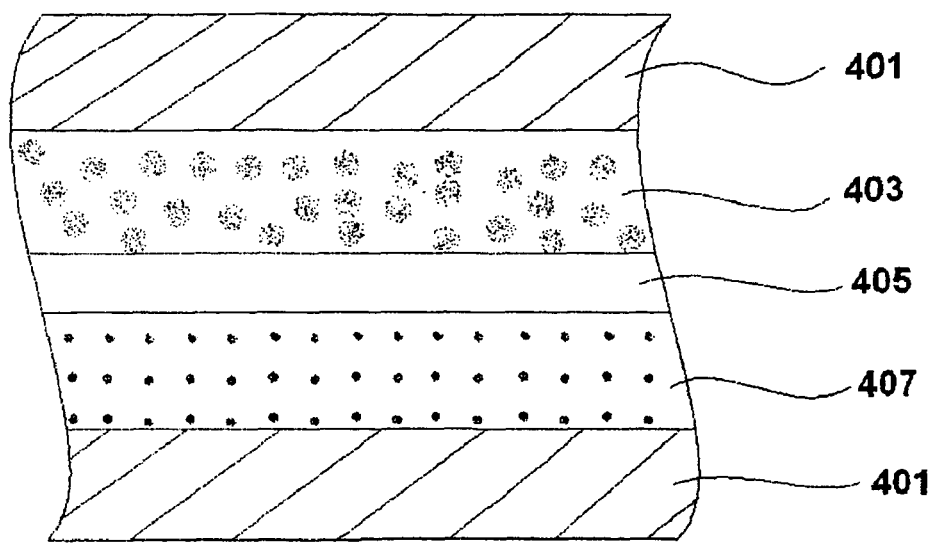
FIG. 2 is a schematic cross-sectional view of a portion of an exemplary lithium-ion battery having a coin shape.

FIG. 2 is a schematic cross-sectional view of a portion of an exemplary lithium-ion battery having a coin shape. Coin-shape lithium-ion battery 400 includes case 401, negative electrode 403, positive electrode 407, and separator 405 disposed between negative electrode 403 and positive electrode 407 in order to electrically insulate negative electrode 403 and positive electrode 407. The position of negative electrode 403 and positive electrode 407 may be exchanged.

The lithium vanadium composite oxides were ground to have a maximum particle diameter of 75 μm or smaller. Then, 6 wt % of denka black (registered mark, produced by Denki Kabushiki Gaisha) and 4 wt % of polyvinylidene fluoride were added to 90 wt % of the acquired powder, and N-methylpyrrolidone as a solvent was added thereto to prepare a slurry. The slurry was coated at 10 mg/cm² on a 15 μm-thick copper film and dried at 130° C. A disk with a diameter of 13 mm was cut out of the film and compressed to have a predetermined thickness, preparing a negative electrode. This negative electrode and metallic lithium as a positive electrode were used to fabricate a coin cell. The coin cell was evaluated regarding battery characteristics.

In the coin cell, a 20 μm-thick polyethylene porous film was included as a separator, and 1.2M of $LiPF_6$ dissolved in a mixed solvent of ethylene carbonate/diethyl carbonate in a ratio of 3/7 was used as an electrolyte solution.

The coin cell was charged with constant current (0.5 C)-constant voltage (4.2V) and discharged at a discharge cut-off voltage of 0.5 C to 2.75V and then the above charge and discharge were repeated thirty times. Discharge capacity was measured at the first cycle and the thirtieth cycle.

The experimental results are shown in Table 2.

The values in Table 2 were calculated as a ratio based on discharge capacity (mAh/g) of the coin cell of Comparative Example 1 at the first cycle as 100%.

TABLE 2

| | | 1st cycle discharge capacity (%) | 30th cycle discharge capacity (%) |
|---|---|---|---|
| Example | 1 | 109 | 91 |
| | 2 | 111 | 91 |
| | 3 | 113 | 99 |
| | 4 | 110 | 96 |
| | 5 | 105 | 86 |
| | 6 | 108 | 87 |
| | 7 | 109 | 95 |
| | 8 | 112 | 103 |
| | 9 | 109 | 98 |
| | 10 | 111 | 97 |
| Comparative Example | 1 | 100 | 73 |
| | 2 | 96 | 77 |
| | 3 | 90 | 72 |
| | 4 | 102 | 81 |

As shown in Table 2, lithium ion batteries in the examples had larger initial capacity than those of the comparative examples, and did not have deteriorated capacity after charge and discharge cycles.

In addition, the lithium vanadium composite oxides including Al, Ti, Zr, and Mo as an additive element could suppress capacity deterioration and thereby improve the cycle characteristic, compared to those of Example 2 and Examples 7 through 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a lithium ion battery, comprising:
   a hexagonal lithium vanadium composite oxide comprising lithium (Li), vanadium (V), and magnesium (Mg), with the lithium and the vanadium having a mole ratio in a range of $1.15 \leq Li/V \leq 1.35$ and the magnesium and the vanadium having a mole ratio in a range of $0.01 \leq Mg/V \leq 0.06$.

2. The negative active material of claim 1, with the lithium vanadium composite oxide further comprising at least one element selected from the group consisting of elements belonging to Group IIA through Group IVB in the periodic table.

3. The negative active material of claim 1, with the lithium vanadium composite oxide further comprising at least one element selected from the group consisting of Ti, Zr, Mo, and Al.

4. The negative active material of claim 1, with the lithium vanadium composite oxide having a ratio of lattice constants a and c within a range of $5.10 \leq c/a \leq 5.15$.

5. The negative active material of claim 1, with the lithium vanadium composite oxide having a single exothermic peak at a temperature ranging from 90° C. to 130° C. measured by a differential scanning calorimetry (DSC).

6. A negative electrode comprising the negative active material for a lithium ion battery, comprising:
   a hexagonal lithium vanadium composite oxide comprising lithium (Li), vanadium (V), and magnesium (Mg), with the lithium and the vanadium having a mole ratio in a range of $1.15 \leq Li/V \leq 1.35$ and with the magnesium and the vanadium having a mole ratio in a range of $0.01 \leq Mg/V \leq 0.06$.

7. The negative electrode of claim 6, with the lithium vanadium composite oxide further comprising at least one element selected from the group consisting of elements belonging to Group IIA through Group IVB in the periodic table.

8. The negative electrode of claim 6, with the lithium vanadium composite oxide further comprising at least one element selected from the group consisting of Ti, Zr, Mo, and Al.

9. The negative electrode of claim 6, with the lithium vanadium composite oxide having a ratio of lattice constants a and c within a range of $5.10 \leq c/a \leq 5.15$.

10. The negative electrode of claim 6, with the lithium vanadium composite oxide having a single exothermic peak at a temperature ranging from 90° C. to 130° C. measured by a differential scanning calorimetry (DSC).

11. A lithium secondary battery, comprising:
a positive electrode comprising a positive active material that can intercalate and deintercalate lithium ions;
a negative electrode comprising a hexagonal lithium vanadium composite oxide comprising lithium (Li), vanadium (V), and magnesium (Mg), with the lithium and vanadium having a mole ratio in a range of $1.15 \leq Li/V \leq 1.35$ and the magnesium and vanadium having a mole ratio in a range of $0.01 \leq Mg/V \leq 0.06$; and
an electrolyte disposed to fill the lithium secondary battery.

12. The lithium secondary battery of claim 11, with the lithium vanadium composite oxide further comprising at least one element selected from the group consisting of elements belonging to Group IIA through Group IVB in the periodic table.

13. The lithium secondary battery of claim 11, with the lithium vanadium composite oxide further comprising at least one element selected from the group consisting of Ti, Zr, Mo, and Al.

14. The lithium secondary battery of claim 11, with the lithium vanadium composite oxide having a ratio of lattice constants a and c within a range of $5.10 \leq c/a \leq 5.15$.

15. The lithium secondary battery of claim 11, with the lithium vanadium composite oxide having a single exothermic peak at a temperature ranging from 90° C. to 130° C. measured by a differential scanning calorimetry (DSC).

16. A lithium secondary battery, comprising:
a positive electrode comprising a positive active material that can intercalate and deintercalate lithium ions;
a negative electrode comprising a hexagonal lithium vanadium composite oxide comprising lithium (Li), vanadium (V), and magnesium (Mg), with the lithium and vanadium having a mole ratio in a range of $1.15 \leq Li/V \leq 1.35$ and the magnesium and vanadium having a mole ratio in a range of $0.01 \leq Mg/V \leq 0.06$;
a separator disposed between the positive electrode and the negative electrode in order to electrically insulate the positive electrode and the negative electrode; and
an electrolyte disposed to fill the lithium secondary battery.

17. The lithium secondary battery of claim 16, with the lithium vanadium composite oxide further comprising at least one element selected from the group consisting of Beryllium (Be), Calcium (Ca), Strontium (Sr), Barium (Ba), Radium (Ra), Scandium (Sc), Yttrium (Y), lanthanoid, actinoid, Titanium (Ti), Zirconium (Zr), Hafnium (Hf) and Rutherfordium (Rf).

18. A method of manufacturing a lithium secondary battery, the method comprising:
preparing a negative electrode preparing a hexagonal lithium vanadium composite oxide comprising lithium (Li), vanadium (V), and magnesium (Mg), with the lithium and the vanadium having a mole ratio in a range of $1.15 \leq Li/V \leq 1.35$ and the magnesium and the vanadium having a mole ratio in a range of $0.01 \leq Mg/V \leq 0.06$;
forming a positive electrode by using a positive active material that can intercalate and deintercalate lithium ions;
forming a separator between the negative electrode and the positive electrode; and
supplying an electrolyte to an electrode assembly comprising the negative electrode, the positive electrode and the separator disposed between the negative electrode and the positive electrode.

* * * * *